United States Patent [19]

Okolischan

[11] 4,407,493

[45] Oct. 4, 1983

[54] SELF-ADJUSTING TOGGLE CLAMPS FOR FACTORY FIXTURES AND THE LIKE

[75] Inventor: Raymond A. Okolischan, St. Louis, Mo.

[73] Assignee: Carr Lane Mfg. Co., St. Louis, Mo.

[21] Appl. No.: 290,387

[22] Filed: Aug. 5, 1981

[51] Int. Cl.³ .............................................. B23Q 3/02

[52] U.S. Cl. ........................................ 269/93; 269/94; 269/228; 81/367

[58] Field of Search ..................... 269/228, 91, 92, 93, 269/94, 237, 239; 81/368, 375, 370, 367

[56] References Cited

U.S. PATENT DOCUMENTS

| | | | |
|---|---|---|---|
| 2,777,347 | 1/1957 | Sendoykas | 269/94 X |
| 3,028,577 | 3/1962 | Strauss | 269/228 X |
| 3,600,986 | 8/1971 | Baldwin | 81/370 |

*Primary Examiner*—James G. Smith
*Assistant Examiner*—Steven P. Schad
*Attorney, Agent, or Firm*—Jerome A. Gross

[57] ABSTRACT

Toggle clamps, such as used for factory fixtures, typically have clamping arms which in use extend over a workpiece or workpieces; to remove the workpieces and insert new ones, the clamping arms must be opened wide, typically through an angle greater than 90°. In prior fixtures this is done by utilizing a conventional four-bar linkage; the fixed geometry of such linkages provides no tolerance for clamping workpieces of different thicknesses except by screw-adjustment of a clamping foot.

The present toggle clamp adjusts itself to a wide range of thicknesses. One of its members has a hollow containing a sliding locking wedge mechanism pivot-connected to the toggle link member of the mechanism; before it assumes the angle for toggle action, the wedge mechanism is held from locking by a cam on this link member. The sides of the hollow member are slotted, the pivot pin extends through the slot so that, for wide angle opening, the link can pull on the pin. In this way variable linkage geometry is provided, with the wedge mechanism sliding and the pin establishing its position in the slot as the clamping arm "sizes" the thickness of the workpiece, preliminary to clamping.

2 Claims, 6 Drawing Figures

SELF-ADJUSTING TOGGLE CLAMPS FOR FACTORY FIXTURES AND THE LIKE

FIELD OF THE INVENTION

This invention refers to toggle clamps such as are generally mounted onto factory jigs and fixtures for holding workpieces during manufacturing operations.

BACKGROUND OF THE INVENTION

Toggle clamps have long been used as factory tooling components, for example, as part of fixtures which releasably hold workpieces during machining, assembly and similar operations. The clamps are adjustable for work-pieces of different thickness by screwing a clamping foot relative to a linkage-operated clamping arm or force-applying member. The member is set in clamping position by an over-center toggle link, manually or power operated by a handle or equivalent, on one of the linkage elements employed. The adjustment for thickness being made by screwing the clamping foot, the clamping arm itself has no substantial range of angular adjustment during clamping.

Since such toggle clamps may be used on opposite edges of workpieces to be assembled, the clamping arms, or force-applying members which extend over the workpieces for clamping, must be withdrawn completely out of the way of the workpieces to permit their removal from the fixture and the placement in the fixture of new workpieces. Accordingly, the linkage utilized in such toggle clamps must provide not merely for releasing the clamping, but in addition a wide range of angular movement for clearance, to permit such removal and placement of the workpieces.

By the term "toggle action" or "toggling" as used in such clamps and in the present invention, is meant using a link member with parallel pivot axes at its ends, in angular movement relative to a centerline between one of its ends, whose position is fixed, and a third parallel pivot axis. In such angular movement, as the other end of the link member approaches this centerline connecting the other two pivots, the link member is subject to intense axial loading, the reactions of which put the members of the linkage mechanism under such strain as to permit such other end of the link to cross the centerline to a "locked" position against a stop. In conventional toggle clamps, the clamping foot is screwed to adjust for thickness, so that the linkage always "toggles" in the same position.

In contrast, in the present invention the effective length of one of the linkage members is automatically changed to respond to the thickness of the workpiece to be clamped. This is done in a manner somewhat like that used in self-adjusting locking pliers. These are hand-held tools, as shown in U.S. Pat. No. 2,531,285 to Manspeaker and No. 3,600,986 to Baldwin. Such hand-held tools are, however, substantially different in their design criteria and manner of construction from the present invention. Hand-held tools are brought to the work and withdrawn from it; unlike toggle clamps for factory fixtures, they do not need and they are not provided with a substantial range of movement merely for clearance; once loosened from the article which they have theretofore clamped, they are simply taken away from it.

The locking pliers shown in these patents may be locked in self-adjusted position over a significant range of thicknesses. Their operating principle is this: one jaw of the pliers is integral with a fixed handle to which the other jaw is pivotally attached. The movable handle is pivotally attached to this other, or "moving", jaw. The fixed handle serves as a variable length linkage member; this handle has walls defining a slide path for a locking wedge assembly which carries the pivot at one end of a toggling link, whose other end is pivotally attached to the movable handle at a point spaced from its pivot to the moving jaw. A line connecting this pivot to the pivot carried by the wedge assembly is the centerline across which toggling action must take place. Until angular movement of the link causes its handle pivot to approach this centerline, a cam, formed on the link at its other end which pivots relative to the wedge assembly, holds the assembly unlocked. In toggling action, as the centerline is approached the cam permits the wedge assembly in the fixed handle to lock to its slide path, thus fixing the position of the pivot carried by the wedge assembly.

When the handles are squeezed, if nothing is between the jaws, closing movement of the moving jaw will draw its pivot to the movable handle sufficiently forward that the wedge assembly may remain in its most forward position along its slide path. Then, as the jaws close, the link moves angularly so that the cam at its wedge end effects clamping of the wedges in the slide path.

However, if the moving jaw closes against an object of substantial thickness, further squeezing the handles so drives the link that its end pivoted to the wedges will slide them up the handle, permitting the link to move angularly until the cam causes the wedges to clamp in their then established position along the slide path. When so clamped, toggling forces can be reacted; hence the jaws clamp securely as the handle-to-link pivot crosses such centerline.

To release the clamping, the initial movement of drawing the handles apart causes this pivot to re-cross the centerline; after this point, the wedge assembly releases its affixment to the slide path and a tension spring draws it forward, and also draws the movable jaw to open position and the handles farther from each other.

SUMMARY OF THE INVENTION

The principal object of the present invention is to provide toggle clamps of otherwise familiar types, with linkages which automatically adjust themselves for different workpiece thicknesses without the loss of the necessary function of providing to the clamps a wide range of clearance movement after release from clamping, thus to permit workpieces to be easily positioned in and removed from fixtures, as where toggle clamps may be adjacent to opposite edges of such workpieces. Another object is to assure that a selected clamping force is maintained although workpieces of differing thickness are inserted for clamping. A further object is to afford to such self-adjusting linkage the ability to transmit linkage forces in either axial direction; so that manual force may be applied through the linkage either to withdraw a clamping arm (or other clamping force applying member) completely out of the way of the workpiece for its easy removal and then reposition it preliminary to clamping by a reversal of direction of the manual force.

These purposes and others which will be apparent from the description and discussion which follows, are effected, in the present invention, by providing, in addition to a link member, a slide path and mechanism to lock therealong, in either a base member, a clamping force-applying member, or a handle member, depending on the design of the linkage. During clamping these are used much in the same manner as in such locking pliers. However, in the wall of such slide path member is provided a bearing surface against which slides the projecting end of a link pivot. On extreme movements of the link to achieve clearance of workpieces, components of force perpendicular to the bearing surface are transferred, by sliding contact of the pivot end, to and from the link member. This permits strong manual forces to be applied both to withdraw the clamping arm, without use of any spring, completely away from the workpiece, and thereafter to reapply it onto the workpiece preliminary to actual clamping.

DESCRIPTION OF THE PREFERRED EMBODIMENT

Figure 1:
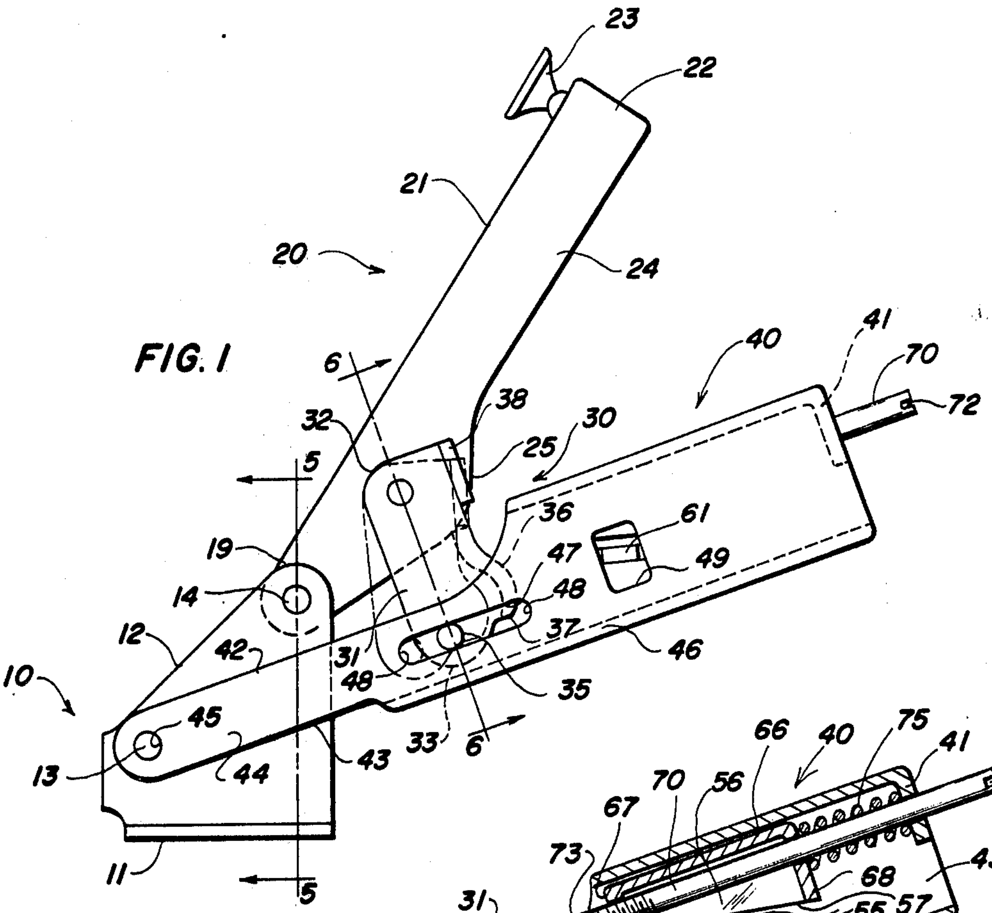
FIG. 1 is a side elevation of a toggle clamp of the type whose handle is substantially vertical when the clamp is engaged, shown fully opened with the link moved to an angular position about 90° from the centerline of the slot, its cam holding the locking wedge assembly disengaged. The phantom lines show an even greater movement of the link.

One popular type of toggle clamp heretofore utilized without the present self-adjustment feature is the type in which the clamping handle is vertical when the mechanism is in clamped position. A preferred form of the present invention is an adaptation of that type of toggle clamp.

A base bracket generally designated 10 is formed of heavy metal construction substantially similar to those of prior toggle clamps. It includes a base plate 11 and a pair of integral spaced-apart upstanding plates 12. Parallel transverse pivots are provided, including a lower inner pivot pin 13 and an upper outer pivot pin 14. The length of the plates 12 between these pivots serves in effect as one bar of a four-bar linkage mechanism.

Figure 3:
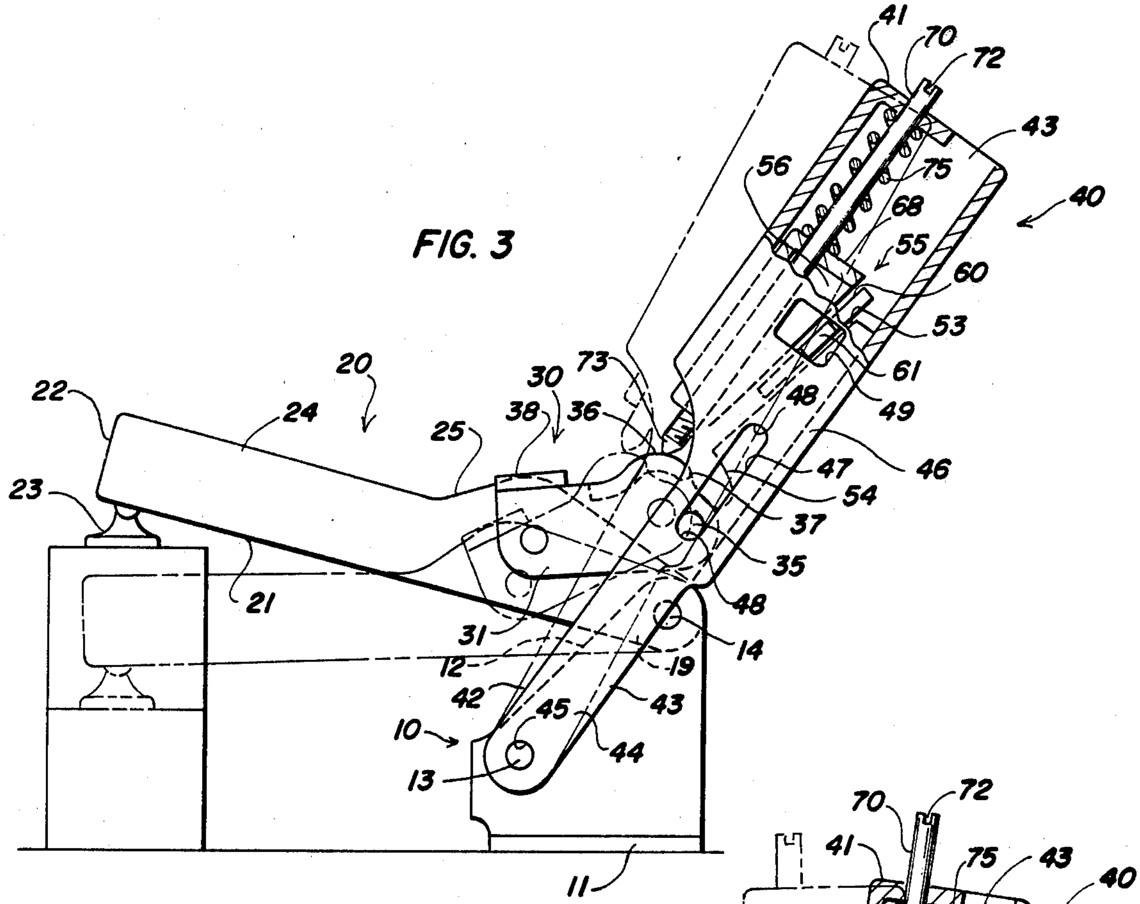
FIG. 3 is a view similar to FIG. 1 showing the clamp in position for sizing a workpiece preliminary to clamping. The solid lines show the position of the parts when sizing a thick workpiece; the phantom lines show their position when sizing a much thinner workpiece. In either position the sliding pivot pin is at the inner end of its slot, the link has moved nearer to alignment with the slot, and its cam continues to hold the wedge assembly disengaged.
Figure 4:
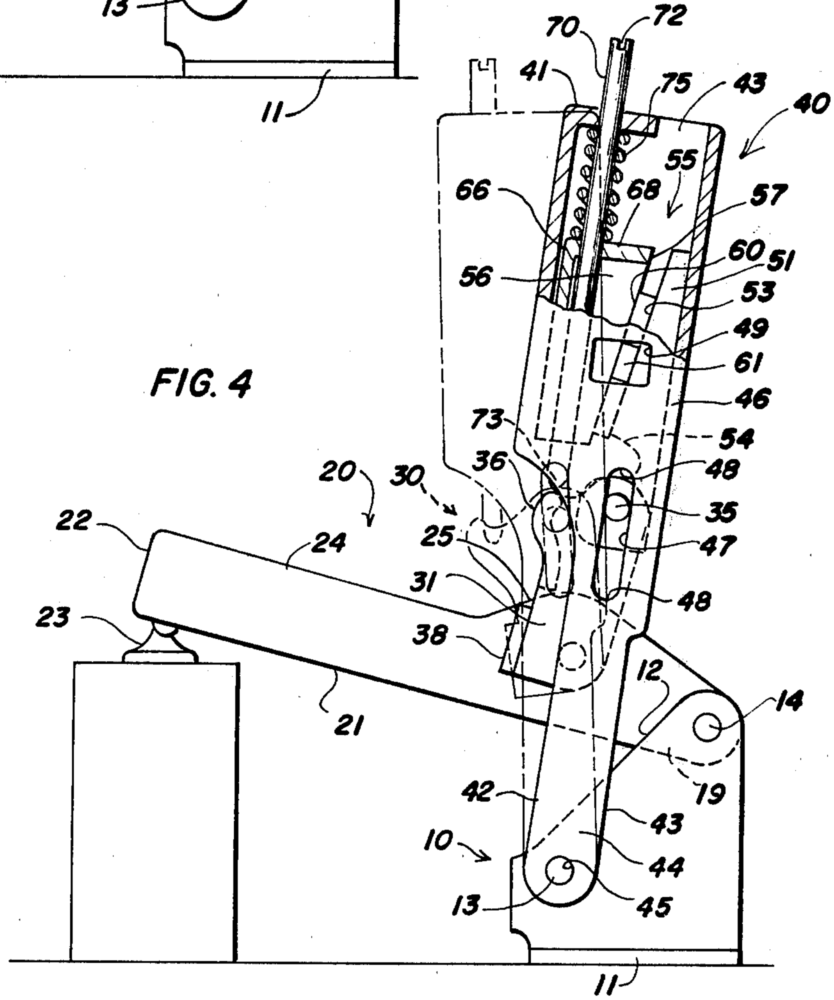
FIG. 4 illustrates the movement of the link and wedge assembly after sizing, in the course of clamping the thick workpiece of FIG. 3. The solid lines show the position of the parts as the toggling action commences; the phantom lines show their position as the handle is stopped in over-center position. The link has driven the sliding pivot pin toward the outer end of its slot and has further rotated so that its cam has been passed, permitting the wedge assembly to lock.

Mounted on the upper outer pivot pin 14 between the plates 12 is the outer end 19 of a clamping arm generally designated 20. Its range of movement on the pivot pin 14 is in excess of 90°; thus it may move from its wide open clearance position, shown in FIG. 1, more than 90° to the positions for sizing and clamping as shown in FIGS. 3 and 4 respectively. The clamping arm 20 is formed conveniently from heavy metal, either solid or welded; its lower edge 21 extends substantially straight to an inner end 22 bearing a pivoted, fixed-length clamping foot 23; whereas its upper surface 24 is enlarged by a lobe 25. The lobe 25 is bored transversely to accept a pivot pin 27 whose ends project therefrom, supporting a link member as hereinafter described. A self-adjusting mechanism now to be described obviates the necessity for any clamping foot adjustment. Alternatively, a screw-adjustable clamping foot might be used to extend the range of clamping thickness afforded by the self-adjusting mechanism.

A link member 30 is stamped of one piece of heavy sheet metal, bent from a bridging portion hereafter described to form two parallel side plates 31 spaced apart sufficiently to fit outward of the clamping arm 20. The portions of the side plates 31 at either end have aligned bores so the plates 31 may serve as a first clevis lug portion 32, at one end, for embracing the lobe 25 and mounting onto the lobe pivot pin 27; and at the other end to serve as a second clevis lug portion 33 for embracing a wedge 51 hereafter described and mounting on a sliding pivot pin 35 whose ends project substantially for the purpose later described.

Figure 2:
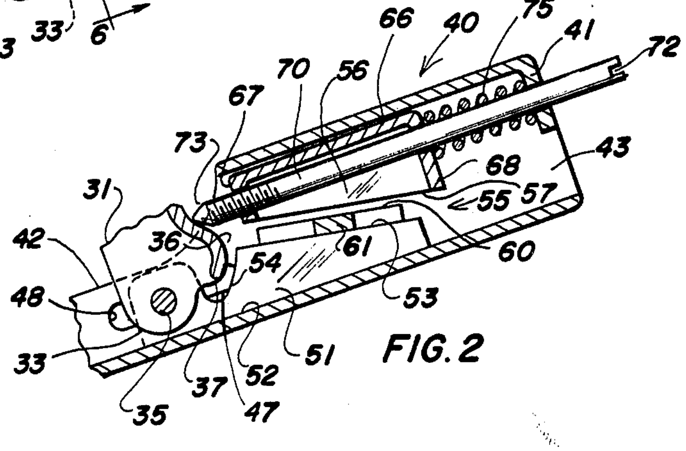
FIG. 2 is a fragmentary view of a portion of the FIG. 1 mechanism with the forward plate of the handle portion broken away, in the position shown in solid lines of FIG. 1.
Figure 5:
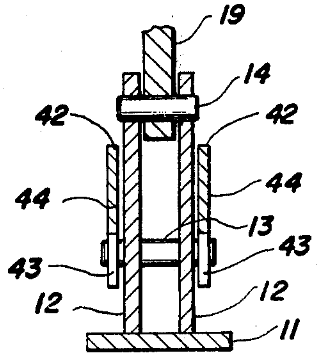
FIG. 5 is a sectional view taken along line 5—5 of FIG. 1.

Bridging between the side plates 31, at their edges shown to the right in FIGS. 1 and 2, and commencing about midway between the bores in their clevis lug portions 32, 33, is a cam portion 36. This arches outward somewhat gradually and as it nears the bore of the clevis portion 33 its effective radius decreases; it then discontinues at a cam surface edge 37.

At the opposite end of the link 30, extending outward from the same side edges, are wing-like over-center stops 38. In clamped position these abut against the edges of the upper edge slot opening, as shown in phantom lines in FIG. 4.

The final member of the four-bar linkage is the handle member generally designated 40. In the embodiment illustrated, it is formed from heavy rectangular hollow steel tubing, whose inner width exceeds the thickness of the link 30 as well as that defined by the spaced-apart plates 12 of the base member 10. At its outer end, an end plate 41 reinforces the handle 40. Starting at its inner end, the rectangular tube which forms the handle 40 is cut away along its upper inner surface for more than half its length to form a long upper edge opening 42; and along its lower outer edge it is cut away for somewhat less than half its length to form a smaller lower opening 43. Between these, the portions of the side walls of the tubing left at the inner end of the handle 40 define elongated clevis arms 44 which fit outwardly of the bracket plates 12 and have aligned bores 45 mounted on the lower inner base pivot pin 13.

Figure 6:
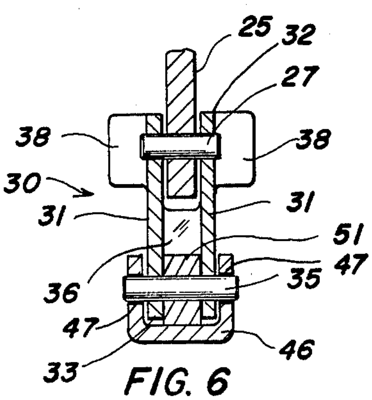
FIG. 6 is a sectional view taken along line 6—6 of FIG. 1.

Inasmuch as the lower edge opening 43 of the handle member 40 is shorter than the upper edge opening 42, the mid-portion 46 of the handle is the channel-shaped section shown in FIG. 6. The end of the link member 30 which bears the transverse pivot pin 35 fits within this channel-shaped section. Its side walls have aligned longitudinal slots 47 whose ends 48 are rounded; the width of the slots 47 is such as to accept slidingly the projecting ends of the sliding pivot pin 35.

Mounted onto the mid-portion of the sliding pivot pin 35, between the adjacent clevis lug ends of the link side plates 31, is a link-connected wedge 51, being part of a locking wedge assembly generally designated 55. The link-connected wedge 51 has a flat lower wedge surface 52 which fits slidably along the inner planar surface of the lower outer tube wall of the handle member 40. The end of the wedge 51 which is so pivot-mounted is its thicker end; it has a sloping wedge face 53 which thins the wedge 51 as it extends toward the outer end of the handle. Thus, starting with the channel section 46 and extending outward, the hollow handle 40 serves as a chamber for the self-adjusting mechanism now being described.

Cut into the wedge 51 between the sliding pivot pin 35 and the operative portions of the slanting wedge face 53 and extending for more than half of the wedge thickness is a curved slot 54; into it fits the edge 37 of the cam portion 36 of the link 30 when the clamp is fully open, as in FIGS. 1 and 2.

The other wedge of the locking wedge assembly 55 is a releasable latching wedge 56. As shown in FIG. 2, it may be formed as an inverted box-like member with sloping side edge surfaces 57, which slope complementary to the sloping surface 53 of the link-connected wedge 51. When in locked position, the sloping edge surfaces 57 engage one side of a separation plate 60, which is flat and of lesser length than the tapered surfaces 53, 57 of the wedges 51, 56. The separation plate 60 has sideward-extending lugs 61 which extend through small window apertures 49 in the side walls of the handle 40; these apertures 49 maintain the plate 60 floating in location without interfering with the relative movement or locking of the wedges.

The releasable latching wedge 56, so formed as an inverted box, has a flat upper inner wall 66 which fits slidingly against the inner surface of the upper inner wall of the handle 40. The wedge box transverse inner and outer ends 67, 68 are formed perpendicular to its wall 66. The inner end 67 is bored and threaded; and the outer end wall 68 has a clearance bore, so that these ends 67, 68 may accept the threaded stem or shank of a pressure adjustment bolt 70 which passes with clearance through a bore in the handle end plate 41. The bolt 70 is adjusted, to adjust the force necessary for toggling, by inserting a screwdriver in and turning its end slot 72 to advance or retract its opposite tip end 73 which may engage the cam 36. Between the wedge box outer end 68 and the handle plate 41, a compression spring 75 surrounds the threaded stem of the pressure adjustment bolt 70.

By reference to FIGS. 1 and 3 it will be seen that when the centerline of the link 30 which connects its pivot pins 27, 35 is in angular position substantially removed from the centerline of the slot 47, its cam 36 will be presented against the tip end 73 of the bolt 70. When so presented, the cam 36 overcomes the bias of the spring 75 to leave the wedge assembly 55 released for freely sliding within the handle member 40. Thus in the course of movement of the handle member 40 from its full open position shown in FIGS. 1 and 2 to one of the sizing positions shown in FIG. 3, the sliding pivot pin 35 will rest at the inner end of the slot 47, toward which it is urged by the compression of the spring 75 as shown in FIG. 1. In this movement the link member 30 will have rotated roughly 60°, causing the tip end 73 of the adjustment bolt 70 to ride up the cam 36 of the link member 30.

Comparing the solid line position of FIG. 3 with that of FIG. 4, as the handle member 40 is rotated farther upward toward a vertical position, the link member 30 moves very rapidly to an angular position nearly in line with that of the slot 47. In so doing it drives the sliding pivot pin 35 and the associated wedge assembly 55 up the hollow handle member 40 to the FIG. 4 position. Toward the end of the rapid angular movement of the link 30, the tip end 73 of the bolt 70 passes over the cam edge surface 37 and drops into the space between the plate portions 31 of the second clevis lug 33, releasing the bias of the spring 75 and thereby locking the wedge assembly 55 in the position it has then assumed in the handle member 40. The detail design of these parts is such that only after rotation of the link member 30 has brought it to a fairly small angle from the line of the slot 47 does the bolt 70 drop over the edge 37 of the cam 36, setting the locking wedge assembly 55 and hence the sliding pivot pin 35 in fixed position. After this has occurred, the mechanism must function similar to conventional four-bar linkage toggle clamps. Thus, further angular movement of the link member 30, to bring the pivot pin 27 across a line which connects the lower inner pivot pin 13 of the space bracket with the sliding pin 35, can then be achieved only by deflection of the linkage members (including of course the clamping foot 23). However, as is typical of toggle clamps, such deflection need be quite small, because the deflection required is a cosine function of a small angle. For so small a deflection of the parts, the handle may be moved from the solid line position of FIG. 4 to the phantom line position therein, in which the stop wings 38 engage the edges of the upper edge opening 42 of the handle member 40. The force required for this may be adjusted by turning the outer end 72 of the bolt 70.

To release a workpiece so clamped, the handle 40 is manually forced outward from the phantom line to the solid line position of FIG. 4, releasing the clamp. The handle member 40 is then thrust outward and downward to the FIG. 1 position. Because of the relatively large movements of the linkage members relative to each other, the small mechanical advantage available during some phases of movement, and friction attendant to such movement, a sizable force may be required if the clamping arm is to be raised swiftly from the FIG. 4 position and drawn to the clearance position of FIG. 1. Except for such large opening force, the sliding pivot pin 35 would move from its upward position in the slot shown in FIG. 4 to its position at the base of the slot shown in phantom lines in FIG. 1 and FIG. 3. However, as long as a substantial opening force is required, such as will require the link member 30 to transmit a large amount of tension, such tension force is exerted by the outstanding ends of the sliding of the transverse pivot pin 35 bearing against the edge surface of the slot 47; and when these ends must transmit the force by bearing against the elongated slot surface 47, the link member 30 tends to assume a position perpendicular to the elongated slot surface 47 as best seen in FIG. 1. With the wedge assembly 55 so held released, throughout all angles except those close to alignment with the slot 47, the link member 30 is free to assume the required angular position for force transfer. Thus the present toggle clamp mechanism provides not only the self-adjustment feature, which requires the slidable pivot pin 35 to slide, but also permits its end to serve in force transfer relationship at the angular position shown in solid lines in FIG. 1 to draw the clamping arm to full clearance position. In this position the link member 30, and particularly its cam 36, would be expected to interfere with the link-moved wedge member 51. The extreme angular movement of the link member 30, as required, is made possible by an opening, here provided as a slot 54, between the sliding wedge pivot pin 35 and the sloping surface 53 of the link-moved wedge member 51.

It will be apparent from the foregoing that, by simple design modifications, the present invention may be readily adapted to other known types of toggle clamps, including those operated by power cylinders rather than manually. Such other well known types include those in which the handle is horizontal and opposite the clamping arm when in clamped position, which like the vertical handle design utilizes four pivot pins and parallel axes; and also the push-pull type clamp in which three parallel axes pivots cooperate to slide the clamping member in the plane of movement, that is, the plane to which the three pivots are perpendicular. Likewise, instead of a manually-operated handle, the mechanism may be mechanically actuated, for example, pneumatically; therefore in the claims the term "actuator member" is used to include "handle".

It will further be apparent that, by minor design modifications, the sliding wedge assembly may be housed in the clamping arm member or in the base member, rather than in the handle or actuator member. It will further be apparent that the invention may be adapted to use a locking assembly other than a pair of wedges; thus, an oval shaped cam, urged to locking position within walls by a torque spring whose bias is overcome by a similar pin and cam arrangement, may be preferred for certain utilizations. In view of such prospective utilizations, other variations will be apparent to those skilled in the art.

I claim:

1. A toggle clamp adapted to project a force-applying member over, and retract it from, position for clamping workpieces of varying thickness, comprising (a) a base member having portions supporting two pivots, the first of said pivots being adjacent to the side of the base member at which clamping is to be effected and the second of said pivots being at the opposite side of said base member and at a higher elevation than the first, (b) a clamp force-applying member having at one end clamp foot means, its opposite end being hingedly pivoted on the second of said base member pivots, and having, intermediate its ends, a toggling pivot, (c) a link member connected at one end to said toggling pivot and at its opposite end to a slide pivot, and (d) an actuator member whose length greatly exceeds that of the link member, said actuator member including longitudinal spaced-apart clevis arms mounted at one end to the first of said base member pivots and extending therefrom for a length sufficient, on angular movement, to clear the base member support portion of the second of its said pivots, said actuator member having a longitudinal bearing surface providing a slide path relative to which said slide pivot is engaged, said slide path commencing at a point along the actuator member at which the slide pivot is positioned for toggle-clamping an object of a chosen minimum thickness, and extending, from such point, farther from said first base member pivot sufficiently for toggle-clamping an object of greater thickness, whereby, when the clamp force-applying member is driven against such object of greater thickness for clamping, the slide pivot is driven away from the first base pivot sufficiently to permit the link member to align itself with the actuator member and to toggle, in combination with (e) locking means mounted on said slide pivot, born by the actuator member and longitudinally slidable relative thereto when released, (f) the link member having means, adjacent to its connection to said slide pivot, to hold said locking means released except when the link member is in an angular position near alignment with the actuator member, whereby, on withdrawing the force-applying member by angular rotation of the actuator member over and across the base point of the force-applying member, the force-applying member is fully retracted from above such workpiece with the link member substantially perpendicular to the slide path.

2. A toggle clamp as defined in claim 1 wherein that portion of the actuator member bearing the locking means has a hollow wall, and its said bearing surface is a longitudinal edge of a slot through said hollow wall, through which slot the slide pivot extends.

* * * * *